United States Patent [19]

Whitaker

[11] 4,417,739

[45] Nov. 29, 1983

[54] AUXILIARY WHEEL SUPPORT FOR LOAD CARRYING VEHICLES

[76] Inventor: Robert F. Whitaker, 1304 N. Council Ave., Ontario, Calif. 91764

[21] Appl. No.: 280,070

[22] Filed: Dec. 9, 1981

[51] Int. Cl.³ .............................................. B62D 61/12
[52] U.S. Cl. .............................. 280/81 A; 280/405 R; 180/24.02
[58] Field of Search ................. 280/767, 405 R, 81 A, 280/81 R; 180/24.01, 24.02

[56] References Cited

U.S. PATENT DOCUMENTS 2,877,023 3/1959 Shaffer ................................ 280/81 A
4,314,709 2/1982 Silbernagel ..................... 280/405 R

FOREIGN PATENT DOCUMENTS 1577295 8/1969 France ............................ 280/81 A Primary Examiner—John A. Pekar
Assistant Examiner—D. Lynn Fugate
Attorney, Agent, or Firm—John H. Crowe

[57] ABSTRACT

Auxiliary support wheels for a heavily laden vehicle are mounted for castered movement on a transversely extending axle carried by an auxiliary frame structure, which extends rearwardly from the vehicle frame. The auxiliary wheel spindles are connected by a tie rod and compression springs are stressed between opposite sides of a projection on the axle and adjustable elements on the tie rod to reduce sidewise swaying of the vehicle.

2 Claims, 2 Drawing Figures

U.S. Patent  Nov. 29, 1983  4,417,739 es of 48,000 pounds and this normally exceeds
AUXILIARY WHEEL SUPPORT FOR LOAD CARRYING VEHICLES

BACKGROUND OF THE INVENTION

1. Field of the Invention

This invention relates to vehicles for transporting heavy loads and has particular reference to auxiliary wheel apparatus for assisting the usual front and rear vehicle wheels when transporting heavy loads.

2. Description of the Prior Art

Many vehicles, such as trucks, are intended to carry loads which exceed the safe carrying capacity of the usual vehicle wheels or which exceed the maximum load capacity of the wheels as authorized by law. This is especially true of concrete transporting trucks for carrying freshly mixed concrete to intended pouring sites. For example, a twelve cubic yard load of concrete carried by a typical concrete transporting truck weighs on the order of 48,000 pounds and this normally exceeds the legal allowable load carrying capacity for trucks of this type unless equipped with auxiliary load carrying means.

In order to satisfy load and safety requirements, concrete transferring trucks have usually heretofore been equipped with auxiliary load carrying wheels which are mounted to the rear of the conventional rear truck wheels. Such auxiliary wheels are mounted to freely caster about vertical axes so that they may track or roll in alignment with the truck since this reduces sidewise skidding and consequent wear of the auxiliary wheel tires, especially when the truck is turned in different directions. However, because of the heavy loads carried by such trucks, they tend to sway from side to side while travelling along a roadway, particularly if such roadway is uneven. If such swaying becomes excessive, it can result in overturning of the truck. Further, if one of the auxiliary wheels should experience a blow-out or other damage to its tire, the latter will tend to drag the truck to one side, also with the possibility of causing the truck to overturn.

It has been found that some reduction in sidewise swaying can be effected by causing the auxiliary wheels to "tow-in", i.e. to cause the general planes of the auxiliary wheels to converge and to intersect at some distance ahead. However, such tow-in causes excessive tire wear and difficulty in steering.

Accordingly, a principal object of the present invention is to provide means for reducing the tendency of heavily laden vehicles to sway sideways while they are travelling along a roadway.

Another object is to provide means for reducing the possibility of a heavily laden vehicle going out of control due to a tire blow-out or other damage to one of the supporting wheels.

Another object is to reduce the wear on the tires of auxiliary load supporting wheels of the aforementioned type.

A further object is to provide a device capable of accomplishing the above objects which is simple, reliable and economical to manufacture.

According to the invention, the free turning auxiliary load carrying wheels of a vehicle of the above type have their spindles pivotally supported for a castering movement about vertical axes by an axle mounted on a frame structure. The spindles are interconnected by a transversely extending tie rod and stressed springs are mounted between the tie rod and the axle to yieldably hold the auxiliary wheels in planes normally extending parallel to the length of the vehicle. When the truck is turned, the auxiliary wheels swivel or caster about their spindle pivots to enable such wheels to track without skidding sideways, during which time one of the springs is further stressed and the other is relaxed. Then, when the vehicle subsequently returns to travel in a straight line, the stressed spring will aid in returning and maintaining the auxiliary wheels in planes parallel to the length of the vehicle and will also aid in overcoming any tendency for the vehicle to sway from side to side.

BRIEF DESCRIPTION OF THE DRAWINGS

The manner in which the above and other objects of the invention are accomplished will be readily understood on reference to the following specification when read in conjunction with the accompanying drawing, wherein.

DESCRIPTION OF THE PREFERRED EMBODIMENT

Figure 1:
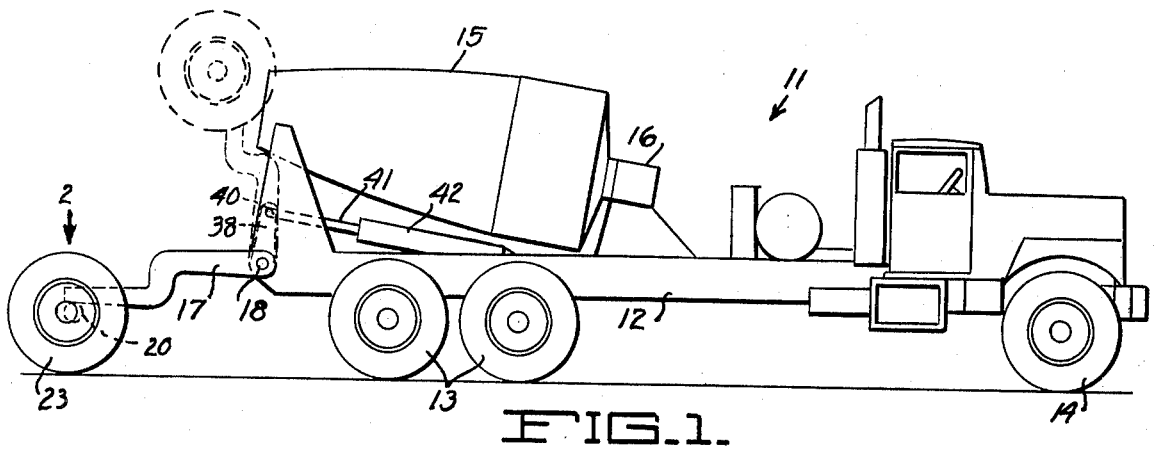
FIG. 1 is a side view of a concrete transporting truck incorporating a preferred form of the present invention.
Figure 2:
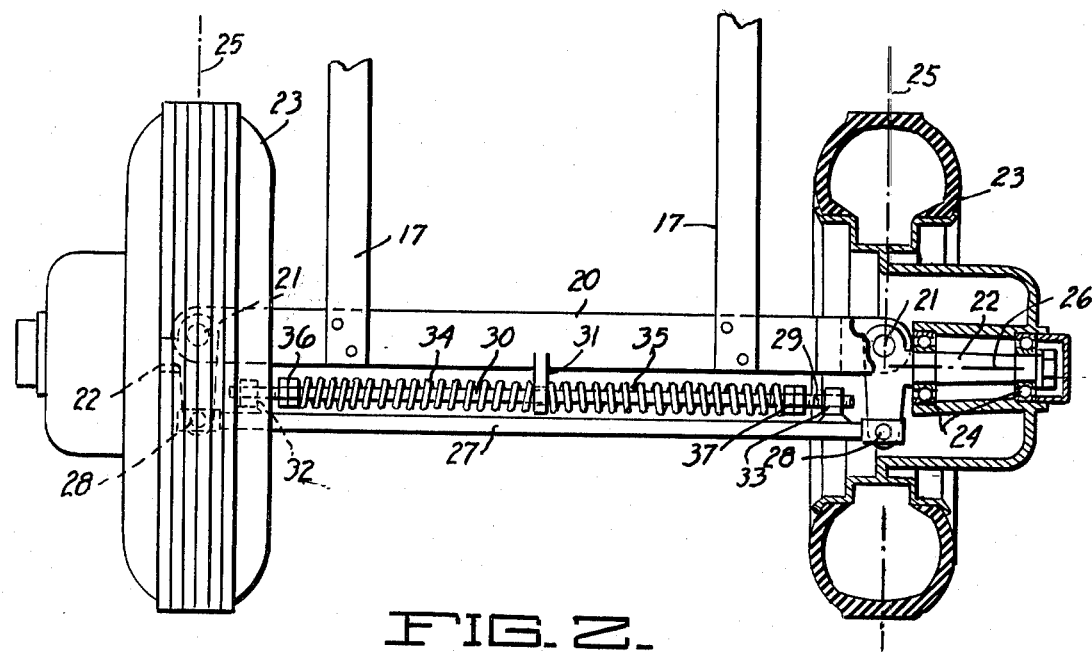
FIG. 2 is a plan view of the auxiliary load supporting wheel apparatus and is taken in the direction of the arrow 2 in FIG. 1.

While this invention may be embodied in many different forms, there is shown in the drawing and will be described in detail one specific embodiment, with the understanding that the present disclosure is to be considered as an exemplification of the principles of the invention and is not intended to limit the invention to the particular embodiment disclosed.

Referring to the drawing, a self-powered concrete supporting truck is generally indicated at 11 and comprises a frame structure 12 supported by two sets 13 of rear wheels and a set 14 of steerable front wheels.

A concrete containing and mixing drum 15 is suitably supported for rotation about its longitudinal axis and is rotated by a suitable motor 16.

An auxiliary frame structure 17 is pivotally connected at 18 to the rear end of the main frame structure 12 and is attached at its rear to a transverse axle 20. The latter carries vertical Kingpins 21 at opposite ends thereof for pivotally supporting wheel spindles 22 for pivotal movement about the axes of the pins. The spindles 22 rotatably support auxiliary load supporting wheels 23 through bearings 24.

It should be noted that the general plane 25 of each of the wheels 23 extends coincident with the axis of the respective Kingpin 21. Also, such Kingpin is located with its axis forwardly of the respective wheel bearing axis 26 so that the wheels can caster or align themselves with the truck when the latter is travelling in a straight line or to swivel in an appropriate direction when the truck is steered from such straight line.

A tie rod 27 is pivotally connected at its opposite ends at 28 to both wheel spindles 22 rearwardly of the Kingpins 21 to maintain the auxiliary wheels 23 in parallel relationship with each other at all times.

According to the invention, a rod 30 is provided which is mounted for endwise movement in a hole formed in a bracket projection 31 integrally secured to the axle 20 intermediate the ends of the latter. The rod 30 is screw threaded at opposite ends thereof at 29 and is suitably secured in brackets 32 and 33 integrally mounted on the tie rod 27 near the opposite ends of the latter.

Compression springs 34 and 35 are loosely mounted over the rod 30 on opposite sides of the bracket 31 and are interposed under stress between the bracket and pairs of adjustable locking nuts 36 and 37 threaded on the rod 30.

The tie rod 27 is preferably of such length that the distance between the axes of the pivots 28 is exactly the same as the distance between the axes of the Kingpins 21 so that the general planes 25 of the wheels 23 are parallel. Also, the nuts 36 and 37 are preferably adjusted to equally stress the springs 34 and 35 to yieldably maintain the auxiliary wheels 23 in parallel relation to the length of the truck when the latter is travelling in a straight line. This reduces wear on the auxiliary wheel tires to a minimum. Such springs 34 and 35 resist any tendency for the truck to sway from side to side when travelling along a roadway, and also aid the truck operator in steering along a straight line, thus reducing driving effort and fatigue. Further, in the event of a blowout or other damage to a tire of one of the auxiliary wheels 23, one of the springs will resist any tendency for the truck to be dragged sideways. However, when the truck is turned from a straight line direction, the springs 34 and 35 will permit the auxiliary wheels to track in the appropriate direction without skidding sideways.

The auxiliary frame 17 carries an arm 38 which is pivotally connected at 40 to the ram 41 of a fluid operated cylinder 42. The latter may be actuated under control of the truck operator to swing the frame 17 and auxiliary wheels 23 into their upper dotted line positions when no load is being carried or for other reasons.

I claim:

1. An auxiliary support for a vehicle having a frame structure for supporting a load, said frame structure including an axle extending transversely of said vehicle, rear support wheels, auxiliary wheels located rearwardly of said rear wheels, spindles supporting said auxiliary wheels for rotation about wheel axes, pivot means on said structure supporting said spindles for pivotal movement about vertical axes located forwardly of said wheel axes whereby to enable said wheels to caster about said vertical axes, means on said axle supporting said pivot means, and a tie rod connected between said spindles, comprising:

stressed spring means extending between said tie rod and said frame structure for yieldably maintaining said wheels in tracking relation with said vehicle and for yieldably resisting said pivotal movement of said auxiliary wheels about said vertical axes;

a projection on said axle intermediate the ends thereof, said projection having a hole therein;

a guide rod movable endwise in said hole; and means attaching said guide rod to said tie rod;

said spring means comprising a pair of compression springs slidable on said guide rod, adjacent ends of said spring means engaging said projection; and said guide rod having means thereon engaging the opposite ends of said springs whereby to maintain said springs in compression.

2. An auxiliary support as defined in claim 1 comprising screw-threaded sections on said guide rod, and the means on said guide rod engaging the opposite ends of said springs comprising nuts threaded over said screw-threaded sections and engaging said opposite ends whereby to adjustably vary the compressive stress applied to said springs.

* * * * *